US012598130B2

(12) United States Patent
Liu et al.

(10) Patent No.: US 12,598,130 B2
(45) Date of Patent: Apr. 7, 2026

(54) FAILURE PROTECTION METHOD AND APPARATUS, STORAGE MEDIUM, AND ELECTRONIC DEVICE

(71) Applicant: ZTE Corporation, Shenzhen (CN)

(72) Inventors: Yao Liu, Shenzhen (CN); Yubao Wang, Shenzhen (CN); Shaofu Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 324 days.

(21) Appl. No.: 18/276,230

(22) PCT Filed: Jan. 11, 2022

(86) PCT No.: PCT/CN2022/071398
§ 371 (c)(1),
(2) Date: Aug. 7, 2023

(87) PCT Pub. No.: WO2022/166543
PCT Pub. Date: Aug. 11, 2022

(65) Prior Publication Data
US 2024/0121178 A1     Apr. 11, 2024

(30) Foreign Application Priority Data

Feb. 5, 2021   (CN) .......................... 202110163438.1

(51) Int. Cl.
*H04L 45/00*          (2022.01)
*H04L 45/28*          (2022.01)
*H04L 12/46*          (2006.01)

(52) U.S. Cl.
CPC .......... *H04L 45/28* (2013.01); *H04L 12/4675* (2013.01)

(58) Field of Classification Search
None
See application file for complete search history.

(56) References Cited

U.S. PATENT DOCUMENTS 9,036,641 B2 *  5/2015  Allan ...................... H04L 12/66
370/392

FOREIGN PATENT DOCUMENTS

CN        111224870 A       6/2020
CN        111682996 A       9/2020
(Continued)

OTHER PUBLICATIONS

International Search Report for corresponding application PCT/CN2022/071398 filed Jan. 11, 2022; Mail date Apr. 1, 2022.

*Primary Examiner* — Gerald A Smarth
(74) *Attorney, Agent, or Firm* — CANTOR COLBURN LLP

(57)                ABSTRACT
Provided are a failure protection method and apparatus, a storage medium, and an electronic device. The method includes: configuring a protection relationship on a standby node, wherein the protection relationship is configured to indicate an object to be protected by the standby node; receiving SID information advertised by a primary node, wherein the SID information at least includes: an SID network programming function type and an SID value; matching the SID network programming function type with an SID network programming function type of the standby node, matching the SID value with the protection relationship, and in a case where the SID network programming function type is successfully matched with an SID network programming function type of the standby node and the SID value is successfully matched with the protection relationship, generating a protection entry.

19 Claims, 4 Drawing Sheets

(56) References Cited

FOREIGN PATENT DOCUMENTS

| | | | | | |
|---|---|---|---|---|---|
| EP | 3641240 | A1 | | 4/2020 | |
| EP | 3907942 | A1 | * | 11/2021 | ........... H04L 45/745 |
| EP | 4236209 | A1 | * | 8/2023 | ............. H04L 45/24 |
| EP | 3641240 | B1 | * | 11/2023 | ............. H04L 45/50 |
| WO | WO-2019105066 | A1 | * | 6/2019 | ............. H04L 45/22 |

* cited by examiner

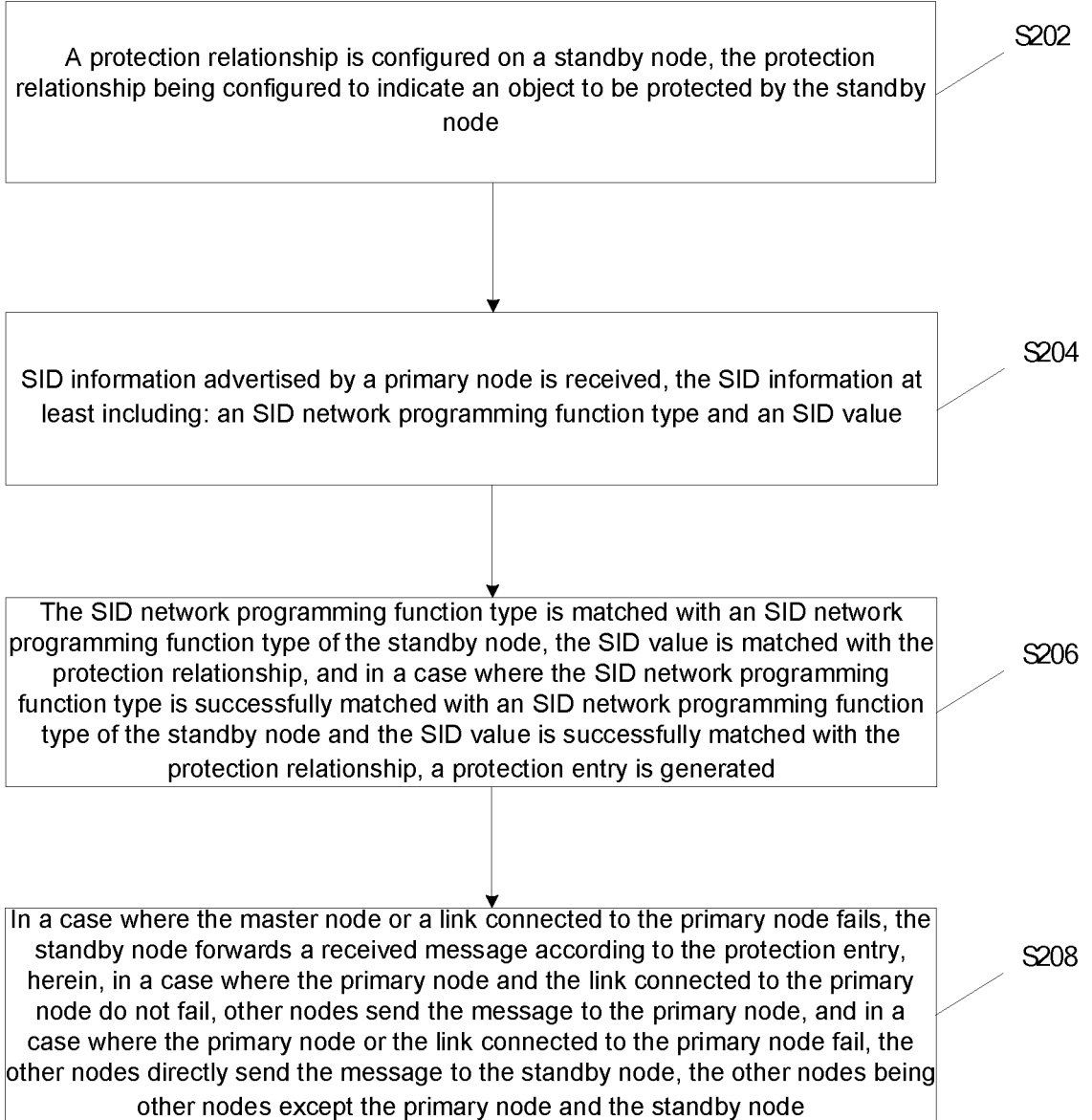

S202

A protection relationship is configured on a standby node, the protection relationship being configured to indicate an object to be protected by the standby node

S204

SID information advertised by a primary node is received, the SID information at least including: an SID network programming function type and an SID value

S206

The SID network programming function type is matched with an SID network programming function type of the standby node, the SID value is matched with the protection relationship, and in a case where the SID network programming function type is successfully matched with an SID network programming function type of the standby node and the SID value is successfully matched with the protection relationship, a protection entry is generated

S208

In a case where the master node or a link connected to the primary node fails, the standby node forwards a received message according to the protection entry, herein, in a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node

Fig. 2

FAILURE PROTECTION METHOD AND APPARATUS, STORAGE MEDIUM, AND ELECTRONIC DEVICE

CROSS-REFERENCE TO RELATED APPLICATION

The disclosure claims priority to Chinese Patent Application No. 202110163438.1, filed to the China National Intellectual Property Administration on Feb. 5, 2021 and entitled "Failure protection Method and Apparatus, Storage Medium, and Electronic Device", the disclosure of which is hereby incorporated by reference in its entirety.

TECHNICAL FIELD

The disclosure mainly relates to the field of communications, in particular to a failure protection method and apparatus, a storage medium, and an electronic device.

BACKGROUND

With the continuous development of science and technology, the scale of a network is becoming larger and larger. A network fault may lead to interruption of service transmission and data loss, which causes serious consequences. However, in real life, due to various reasons, the network fault is inevitable, so that failure protection service transmission becomes very important.

In the related art, failure protection solutions in a Segment Routing (SR)/Segment Routing Internet Protocol Version 6 (SRv6) network mainly include the following solutions:

1) draft-chen-rtgwg-srv6-midpoint-protection. This solution mainly skips a failed node and continues forwarding after the node fails. This method mainly protects the reachability of the whole link, but cannot guarantee that a backup path can provide the same function.

2) draft-hu-spring-segment-routing-proxy-forwarding. This solution introduces a method of performing failure protection on an intermediate node by using a proxy node. By introducing the proxy node, the proxy node may perform proxy forwarding on all or part of neighbor nodes. The proxy node maintains a proxy forwarding entry locally, and looks up the proxy entry for forwarding when receiving a message containing a Segment Identifier (SID) of a protected node from the upstream node. In this solution, the proxy node needs to externally advertise the SR proxy capability through an Interior Gateway Protocol (IGP), and an upstream device should also be able to support receiving a new advertisement message.

3) draft-ietf-rtgwg-srv6-egress-protection. This solution introduces a method of performing egress protection by using a mirrored SID. In a scenario of dual homing tail nodes, two tail nodes may provide the same Virtual Private Network (VPN) forwarding service. The pair of tail nodes may be configured as a mirror group, and a mirror relationship is propagated in the network through the IGP. When a certain node in the mirror group fails, it may reach other nodes in the mirror group through a Fast Reroute (FRR), so as to achieve a purpose of fast convergence. In an SRv6 tail node protection method, a primary egress node is a designated egress node of an SRv6 path. A Segment Routing Header (SRH), abbreviated as SRheader, has a corresponding SID for indicating the primary egress node, which is called the primary egress node SID. At the same time, a standby egress node and a Point of Local Repair (PLR) on the previous hop of the primary egress node provide protection support for the primary egress node. In this solution, a new type of mirrored SID is defined, and the standby node and the PLR need to support this new type of SID, as well as related IGP extensions, which is not very friendly to the old device.

4) draft-hegde-rtgwg-egress-protection-sr-networks. This solution introduces a method of egress protection. In a scenario of dual homing tail nodes, two tail nodes may provide the same VPN forwarding service, the same VPN SID is assigned to the same service, and a prefix corresponding to the SID is advertised as an anycast prefix, which forms anycast FRR protection. The method has the disadvantage that the VPN SID needs to be specified statically to ensure that the VPN SIDs of two Provider Edges (PEs) are consistent, which is not conducive to practical deployment.

For the problems that during failure protection, the intermediate node protection and the tail node protection generally adopt different technologies, which leads to the difficulty in device deployment, etc., no effective technical solution has been proposed in the related art.

SUMMARY

Embodiments of the disclosure provide a failure protection method and apparatus, a storage medium, and an electronic device, so as to at least solve the problems that during failure protection, the intermediate node protection and the tail node protection generally adopt different technologies, which leads to the difficulty in device deployment, etc.

The embodiments of the disclosure provide a failure protection method, which includes that: a protection relationship is configured on a standby node, the protection relationship being configured to indicate an object to be protected by the standby node; SID information advertised by a primary node is received, the SID information at least including: an SID network programming function type and an SID value; the SID network programming function type is matched with an SID network programming function type of the standby node, the SID value is matched with the protection relationship, and in a case where the SID network programming function type is successfully matched with an SID network programming function type of the standby node and the SID value is successfully matched with the protection relationship, a protection entry is generated; and in a case where the primary node or a link connected to the primary node fails, the standby node forwards a received message according to the protection entry. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

According to another embodiment of the disclosure, a failure protection apparatus is also provided, which includes a configuration module, configured to configure a protection relationship on a standby node, the protection relationship being configured to indicate an object to be protected by the standby node; a receiving module, configured to receive SID information advertised by the primary node, the SID information at least including: an SID network programming function type and an SID value; a matching module, configured to match the SID network programming function type with an SID network programming function type of the standby node, match the SID value with the protection relationship, and generate a protection entry in a case where the SID network programming function type is successfully matched with an SID network programming function type of the standby node and the SID value is successfully matched with the protection relationship; and a forwarding module, configured to instruct, in a case where the primary node or a link connected to the primary node fails, the standby node to forward the received message according to the protection entry. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

According to still another embodiment of the disclosure, a computer readable storage medium is also provided, in which a computer program is stored. When running, the computer program is configured to execute the steps in any of the above method embodiments.

According to yet still another embodiment of the disclosure, an electronic device is also provided, which includes a memory and a processor. The memory stores a computer program, and the processor is configured to run the computer program, so as to executes the steps in any of the above method embodiments.

Through the above technical solutions, the protection relationship is configured on the standby node, the protection relationship being configured to indicate the object to be protected by the standby node; the SID information advertised by the primary node is received, the SID information at least including: the SID network programming function type and the SID value; the SID network programming function type is matched with the SID network programming function type of the standby node, the SID value is matched with the protection relationship, and in a case where the SID network programming function type is successfully matched with an SID network programming function type of the standby node and the SID value is successfully matched with the protection relationship, the protection entry is generated; and in a case where the primary node or the link connected to the primary node fails, the standby node forwards the received message according to the protection entry. In a case where the primary node and the link connected to the primary node do not fail, the other nodes send the message to the primary node, and in a case where the primary node or the link connected to the primary node fail, the other nodes directly send the message to the standby node, the other nodes being other nodes except the primary node and the standby node. That is, the protection relationship is configured on the standby node, in a case where the SID network programming function type is successfully matched with the SID network programming function type of the standby node and the SID value is successfully matched with the protection relationship, the protection entry is generated, and then in a case where the primary node or the link connected to the primary node fails, the standby node forwards the received message according to the protection entry. Through the adoption of the above technical solutions, the problems that in the related failure protection technologies, during failure protection, the intermediate node protection and the tail node protection generally adopt different technologies, which leads to the difficulty in device deployment, etc. are solved. The technical solutions of the disclosure are applicable to the failure protection of an intermediate node and an egress node, and a path switched after the fault may provide the same function as the original path.

BRIEF DESCRIPTION OF THE DRAWINGS

The drawings described herein are used to provide a further understanding of the disclosure, and constitute a part of the disclosure, and the exemplary embodiments of the disclosure and the description thereof are used to explain the disclosure, but do not constitute improper limitations to the disclosure. In the drawings:

FIG. 2 is a flowchart of a failure protection method according to an embodiment of the disclosure.

DETAILED DESCRIPTION OF THE EMBODIMENTS

The disclosure is described below with reference to the drawings and in conjunction with the embodiments in detail. It is to be noted that embodiments in the disclosure and features in the embodiments may be combined under the condition of no conflicts.

It is to be noted that terms "first", "second" and the like in the description, claims and the above drawings of the disclosure are used for distinguishing similar objects rather than describing a specific sequence or a precedence order. It should be understood that the data used in this way are interchangeable under appropriate circumstances to facilitate the embodiments described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

Figure 1:
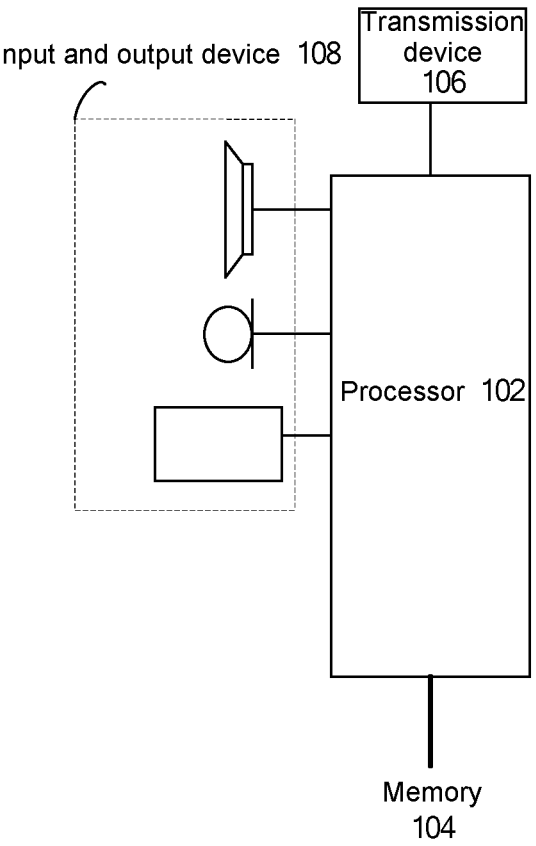
FIG. 1 is a structural block diagram of hardware of a computer terminal of a failure protection method according to an embodiment of the disclosure.

The method provided by the embodiments of the disclosure may be performed in a mobile terminal, a computer terminal or similar computing apparatuses. Taking running on the computer terminal as an example, FIG. 1 is a structural block diagram of hardware of a computer terminal of a failure protection method according to an embodiment of the disclosure. As shown in FIG. 1, the computer terminal may include one or more (only one is shown in FIG. 1) processors 102 (the processors 102 may include, but are not limited to, a Micro Processor Unit (MCU) or a Field Programmable Gate Array (FPGA), and other processing apparatuses), and a memory 104 configured to store data. In an embodiment, the computer terminal may further include a transmission device 106 with a communication function and an input and output device 108. Those of ordinary skill in the art may understand that the structure shown in FIG. 1 is only schematic and not intended to limit the structure of the computer terminal. For example, the computer terminal may further include more or fewer components than those shown in FIG. 1, or has a different configuration with equivalent or more functions than those shown in FIG. 1. The memory 104 may be configured to store a computer program, for example, a software program and a module of application software, for example, a computer program corresponding to the failure protection method in the embodiments of the disclosure. The processor 102 runs the computer program stored in the memory 104, thereby executing various functional applications and data processing, namely implementing the above method. The memory 104 may include a high speed Random Access Memory (RAM) and may further include a non-volatile memory such as one or more magnetic storage apparatuses, a flash memory, or other non-volatile solid state memories. In some examples, the memory 104 may further include memories remotely set relative to the processor 102, which may be connected to the computer terminal through the network. Examples of the network include, but are not limited to, Internet, Intranet, a local area network, a mobile communication network, and a combination thereof. The transmission device 106 is configured to receive or send data through a network. A specific example of the network may include a wireless network provided by a communication provider of the computer terminal. In an example, the transmission device 106 includes a Network Interface Controller (NIC), which may be connected with other network devices through a base station, thereby communicating with the Internet. In an example, the transmission device 106 may be a Radio Frequency (RF) module, which is configured to communicate with the Internet in a wireless manner.

According to an embodiment of the disclosure, a failure protection method is provided, which is applied to a computer terminal. FIG. 2 is a flowchart of a failure protection method according to an embodiment of the disclosure, as shown in FIG. 2, which includes the following operations.

At S202, a protection relationship is configured on a standby node, the protection relationship being configured to indicate an object to be protected by the standby node.

At S204, SID information advertised by a primary node is received, the SID information at least including: an SID network programming function type and an SID value.

At S206, the SID network programming function type is matched with an SID network programming function type of the standby node, the SID value is matched with the protection relationship, and in a case where the SID network programming function type is successfully matched with an SID network programming function type of the standby node and the SID value is successfully matched with the protection relationship, a protection entry is generated.

It is to be noted that, if an SID does not explicitly specify the network programming function type, there is a default network programming function type END, at this time, it is also considered that the SID information contains network programming function type information.

At S208, in a case where the primary node or a link connected to the primary node fails, the standby node forwards a received message according to the protection entry. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

Through the above technical solution, the protection relationship is configured on the standby node, the protection relationship being configured to indicate the object to be protected by the standby node; the SID information advertised by the primary node is received, the SID information at least including: the SID network programming function type and the SID value; the SID network programming function type is matched with the SID network programming function type of the standby node, the SID value is matched with the protection relationship, and in a case where the SID network programming function type is successfully matched with an SID network programming function type of the standby node and the SID value is successfully matched with the protection relationship, the protection entry is generated; and in a case where the primary node or the link connected to the primary node fails, the standby node forwards the received message according to the protection entry. In a case where the primary node and the link connected to the primary node do not fail, the other nodes send the message to the primary node, and in a case where the primary node or the link connected to the primary node fail, the other nodes directly send the message to the standby node, the other nodes being other nodes except the primary node and the standby node. That is, the protection relationship is configured on the standby node, in a case where the SID network programming function type is successfully matched with the SID network programming function type of the standby node and the SID value is successfully matched with the protection relationship, the protection entry is generated, and then in a case where the primary node or the link connected to the primary node fails, the standby node forwards the received message according to the protection entry. Through the adoption of the above technical solution, the problems that in the related failure protection technologies, during failure protection, the intermediate node protection and the tail node protection generally adopt different technologies, which leads to the difficulty in device deployment, etc. are solved. The technical solution of the disclosure is applicable to the failure protection of intermediate and egress nodes/links, and a path switched after the fault may provide the same function as the original path.

It is to be noted that the solution of the disclosure is only applicable to a situation in which both primary and standby nodes support SRv6 networking, excluding Segment Routing Multi-Protocol Label Switching (SR-MPLS). In addition, the other nodes in the network do not have to support SRv6. Furthermore, after the protection relationship is configured on the standby node, if the SID information advertised by the primary node received by the standby node is within the scope of protection, but the standby node does not have the protective capability, the behaviors such as dropping the message and generating an alarm may be performed. The behaviors may be default or configured according to the requirements.

In S208, since the standby node externally floods a prefix of the primary node with a priority lower than that of the primary node, in a case where the primary node or the link connected to the primary node do not fail, the other nodes send the message to the primary node, and in a case where the primary node or the link connected to the primary node fail, the other nodes directly send the message to the standby node.

In an embodiment, the protection relationship may be configured on the standby node by configuring the prefix of the primary node to be protected on the standby node, configuring the primary node to be protected on the standby node, configuring the SID value of the primary node to be protected on the standby node, configuring the SID network programming function type of the primary node to be protected on the standby node, etc.

That is, when the protection relationship is configured on the standby node, the prefix of the primary node to be protected may be configured on the standby node, which may overwrite the required SID of the primary node. One or more prefixes of the primary node to be protected are configured on the standby node, for example, the prefix of the primary node is LOC2, and the prefix LOC2 to be protected may be configured on the standby node. The primary node to be protected may also be configured on the standby node, the SID value of the primary node to be protected may also be configured on the standby node, and the SID network programming function type of the primary node to be protected may also be configured on the standby node, for example, the SID type of the primary node is END, so that the SID of the END type to be protected may be configured on the standby node. No limits are made to the SID information, the prefix of the primary node, etc. in the embodiments of the disclosure.

In an exemplary embodiment, after the SID network programming function type is successfully matched with the SID network programming function type of the standby node and the SID value is successfully matched with the protection relationship, the standby node is instructed to externally flood the prefix of the primary node with the low priority. The low priority is lower than the priority of the primary node during flooding.

That is, the primary node advertises the SID information of the primary node. The advertisement manner may be an IGP, a Border Gateway Protocol (BGP), etc. No limits are made thereto in the embodiments of the disclosure. An advertisement message includes: the SID value and the type of the SID information. After the SID information advertised by the primary node is matched with the protection relationship saved by the standby node, the standby node floods out the prefix of the primary node with the priority lower than that of the primary node. The flooding manner may be the IGP. No limits are made thereto in the embodiments of the disclosure, so that the message is sent to the primary node, and in a case where the primary node fails, the message is forwarded to the standby node again.

Further, after instructing the standby node to externally flood the prefix of the primary node with the low priority, in a case where the standby node no longer has the ability to protect the prefix of the primary node, the primary node, the SID value of the primary node, or the SID network programming function type of the primary node, the standby node revokes the externally flooded prefix of the primary node, and then the standby node no longer has the protection relationship.

In an embodiment, in a case where service function information is also carried in the SID information advertised by the primary node, and the SID network programming function type is an SR proxy function, the SID network programming function type of the standby node is matched with the SR proxy function. In a case where the SID network programming function type of the standby node is matched with the SR proxy function, service function information of an SR proxy of the standby node is matched with the service function information corresponding to the SR proxy function of the primary node. In a case where the service function information of the SR proxy of the standby node is successfully matched with the service function information corresponding to the SR proxy function of the primary node, the protection entry is generated.

In an embodiment, if the advertisement message also carries that the SID network programming function type is the SR proxy function, the SR proxy function is matched first. In a case where the standby node also has the SR proxy function, the matching is successful, and then the service function information corresponding to the SR proxy function also needs to be matched. In a case where the standby node also has the service function information corresponding to the SR proxy function, the matching is successful, and then the protection entry may be generated. It is to be noted that, if the SR proxy function of the primary node is mismatched with one of the service function information corresponding to the SR proxy function, the protection entry is not generated. After the corresponding protection entry is generated, the prefix corresponding to the primary node is flooded out with the low priority through the IGP, etc. For example, if the service function information corresponding to the SR proxy is a Fire Wall (FW), the standby node may further match a FW type with the service function information of the standby node, and generate the corresponding protection entry if all are matched.

Further, if a FW node represents a device that does not support SRv6, the primary node and the standby node have the proxy function, that is, they may replace the FW to process the message. Before the message is sent to the FW, a header is stripped, and after the FW has processed the message and sent it back to the proxy, the proxy encapsulates and continues to forward the header.

In an exemplary embodiment, in a case where service function information is also carried in the SID information advertised by the primary node, the method further includes that: after the standby node receives a VPN route encapsulated by the primary node, the SID network programming function type in the VPN route is matched with the SID network programming function type of the standby node; in a case where the SID network programming function type in the VPN route is matched with the SID network programming function type of the standby node, VPN service information of the SID network programming function type of the standby node is matched with the VPN service information corresponding to the SID network programming function type in the VPN route of the primary node; and in a case where the VPN service information with the SID network programming function of the standby node is matched with the VPN service information corresponding to the SID network programming function type in the VPN route of the primary node, the protection entry is generated.

In an embodiment, after the standby node receives the VPN route sent by the primary node, the standby node performs the longest matching on the VPN SID information in the VPN route and a prefix address in the protection relationship, and in a case where the VPN service information of the standby node is matched with the VPN service information in the VPN route, the protection entry is generated. The forwarding behavior is that the traffic is forwarded to a target object. If the matching is not completed, the protection entry is not generated, and the message of the primary node may not be forwarded when the primary node fails.

In an embodiment, in a case where link information is also carried in the SID information advertised by the primary node, the standby node matches the SID network programming function type with the SID network programming function type of the standby node. In a case where the SID network programming function type is successfully matched with the SID network programming function type of the standby node, the link information is matched with link information of the standby node. In a case where the link information is successfully matched with the link information of the standby node, the protection entry is generated.

In an embodiment, after the standby node receives the link information carried in the SID information sent by the primary node, the standby node matches the SID network programming function type with the SID network programming function type of the standby node, and matches the link information with the link information of the standby node, and in a case where they are successfully matched, the protection entry is generated, and the message is instructed to be sent to the target object along the link.

In an exemplary embodiment, in a case where the primary node does not fail, but the link of a VPN network connected to the primary node fails, the standby node receives a target message sent by the primary node and encapsulated in a preset manner. The target message includes: a VPN SID assigned to the VPN network by the primary node. In a case where the VPN SID is matched with the protection entry, the standby node forwards the received message according to the protection entry. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

It may be understood that in order to prevent the occurrence of a loop, in a case where the link of the primary node fails, after the traffic is forwarded to the primary node, it is found that the link of the primary mode fails, the primary node carries the VPN SID assigned for forwarding the message and forwards the message to the standby node. When the primary node forwards the message to the standby node, in order to ensure that the message is not sent back to the primary node by the other nodes during forwarding, the message sent by the primary node is not directly forwarded by using the VPN SID, and the message carrying the VPN SID is sent to the standby node through an additional encapsulation path or tunnel. After receiving the traffic, the standby node hits the protection entry of the VPN SID of the primary node, and the actions of the protection table entry are that: if the link of the standby node is valid, the traffic is forwarded to the target object, and if the link of the standby node also fails, the message is dropped.

In an embodiment, the above encapsulation manner may be as follows: the tunnel is matched through a tunnel strategy configured on the primary node or through preset conditions in a BGP route, and the VPN SID is encapsulated in the innermost layer of the tunnel for forwarding. When a forwarding tunnel is an SR path, the VPN SID is added to the last one of an SID list for forwarding; or the VPN SID is forwarded by Internet Protocol (IP) in IP, a destination IP on the head of an outer IP is filled with a PE3 BGP link establishment address, and a destination IP of an inner IP is filled with a local VPN SID. No limits are made to the encapsulation manner of the VPN SID in the embodiments of the disclosure.

In order to better understand the process of the failure protection method, the technical solution is explained in combination with optional embodiments below, and is not intended to limit the technical solutions of the disclosure.

Nouns of the optional embodiments of the disclosure are explained below to better understand the solutions of the optional embodiments of the disclosure.

The SR is a source address based routing method of carrying an SRheader in a header of an existing MPLS network or an Internet Protocol Version 6 (IPv6) header, and carrying a series of indication operations (also called segment operations) in the SRH for routing and transmission of data in the network.

An SRv6 segment is a 128-bit number, often referred to as an SRv6 SID or SID. The idea of SRv6 network programming is that the SRv6 SID is regarded as a network instruction, which is composed of a locator, a function and an optional argument. The locator is mainly responsible for a routing function so as to be unique in an SR domain, and the function may indicate any function of the device, such as a forwarding behavior, or a service, etc. The structure of the SRv6 SID is more conductive to programming the network.

An SRv6 VPN (SRv6-based virtual private network) is mainly configured to transfer VPN data based on an SRv6 tunnel. The SRv6 tunnel includes an SRv6 Best Effort (BE) and an SRV6-Traffic Engineering (TE) tunnel. An SRv6 Service SID refers to an SID having a specific service behavior on a PE, such as looking up specific Virtual Routing and Forwarding (VRF), forwarding to a specific next hop, etc.

The flow of the failure protection method is explained in combination with several optional embodiments below, and is not intended to limit the technical solutions of the disclosure.

Embodiment 1

Figure 3:
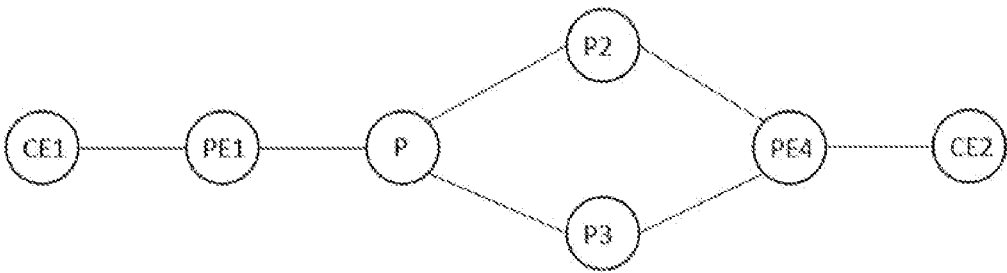
FIG. 3 is a schematic diagram of intermediate node protection networking of a failure protection method according to an optional embodiment of the disclosure.

FIG. 3 is a schematic diagram of intermediate node protection networking of a failure protection method according to an optional embodiment of the disclosure. As shown in FIG. 3, an intermediate node P2 is the primary node, P3 is the standby node, the prefix of P2 is LOC2, SID21 of the type END is assigned to P2, and SID22 of the type END.X is assigned to the link P2-PE4. Similarly, the prefix of P3 is LOC3, SID31 of the type END is assigned to P3, and SID32 of the type END is assigned to the link P3-PE4, and the protection relationship is configured on P3.

The protection relationship is configured on P3 serving as the standby node of P2 in at least one of the following manners.

Manner 1: Configuration is Performed According to the Prefix.

In an embodiment, in an optional embodiment of the disclosure, P3 needs to protect the SID on P2. The prefix to be protected is configured on P3, and the prefix covers the SID to be protected. No limits are made to the number of prefixes, which may be one or more. In this embodiment, the prefix of P2 is LOC2, so that the protection relationship configured by P3 is the prefix LOC2 of P2. After the protection relationship of the SID is configured on P3, LOC2 is flooded out with the low priority through the IGP, the BGP, etc., and an anycast FRR is formed on P, that is, the primary node is P2 and the standby node is P3. The SID information on P2 may be advertised through the IGP, etc. The advertisement message contains a corresponding Locator prefix of the SID, the type of the SID and other information. When the P2 Locator prefix is found and learned on P3 to be the same as or included in a locally configured SID protection prefix, a corresponding Remote SID entry is generated according to the type of the P2 SID. For example, for SID21 of the type END, the Remote END SID entry is generated. For SID22 of the type END.X, PE3 finds that SID22 is assigned to the link PE2-PE4, and PE3, as the protection node of PE2, also has a link to PE4, so that a Remote END.X SID entry is generated, and the action is that the message is sent to PE4.

It is to be noted that, after the protection relationship is configured, if the received SID advertised by the primary node is within the scope of protection, but the standby node does not have the protective capability, the behaviors such as dropping the message and generating an alarm may be adopted. The behaviors may be default or configurable.

Manner 2: configuration is performed according to the node.

In an embodiment, in an optional embodiment of the disclosure, P3 needs to protect the SID on P2, and the node to be protected is configured on P3, which is P2 in this embodiment. In an embodiment, the protection may also be added for a specific type of SID (equivalent to the SID network programming function type in the above embodiment), for example, the SID of the type END is protected only. The SID information on P2 may be advertised through the IGP, etc., and the advertisement message contains the corresponding Locator prefix of the SID, a function type of the SID and other information. When P3 learns the P2 Locator prefix, P2 is the node to be protected, and the SID of this type is the type to be protected, the corresponding Remote SID entry is generated according to the SID type of P2, and then the PE2 Locator prefix is flooded out with the low priority through the IGP.

For the same prefix LOC2, P receives two advertisement messages, the entry with a higher priority is a destination address LOC2, and the next hop is P2. The entry with a lower priority is the destination address LOC2 and the next hop is P3.

Accordingly, when the standby node does not have the ability to protect the specific node, prefix, and SID, the information that has been advertised may be selected for revocation.

Under normal conditions, CE1 sends the traffic to CE2, and the route prefix corresponding to the SID advertised by P2 has a higher priority, for example, the corresponding segment list is <SID-PE1, SID-P, SID21, SID-PE4>. When P2 fails, after the message arrives at P, a destination address is SID21, the message hits a prefix entry with a lower priority and is sent to P3, and the message hits the Remote END SID entry and continues to be forwarded. If the corresponding segment list is <SID-PE1, SID-P, SID22, SID-PE4> and the message hits the Remote END.X SID entry, the message continues to be forwarded and is sent to PE4 along the link P3-PE4.

The above SID types are only examples and are not limited to the functions of protecting the two types END and END.X.

Embodiment 2

Figure 4:
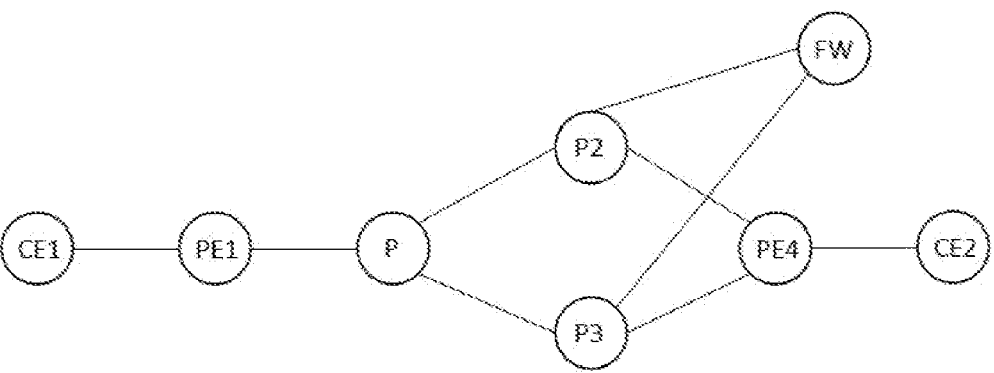
FIG. 4 is a schematic diagram of a service link protection scenario of a failure protection method according to an optional embodiment of the disclosure.

FIG. 4 is a schematic diagram of a service link protection scenario of a failure protection method according to an optional embodiment of the disclosure. As shown in FIG. 4, CE1 to CE2 needs to be filtered by the FW. Under normal conditions, the service flow is CE1→PE1→P→P2→FW→P2→PE4→CE2. The FW is a device that does not support the SRv6, P2 and P3 have the SRv6 proxy function (such as END.AS), that is, they may replace the FW to process the SRv6 message. Before the message is sent to the FW, the SRv6 message header is stripped. After the FW processes the message and sends the message back to the proxy, the proxy encapsulates the SRv6 message header and continues to forward.

The protection relationship is configured on P3. In the Embodiment 2, P3 needs to protect the SID on P2, the node P2 to be protected is configured on P3, and only the SID of a static proxy type is specified to be protected. The SID of a service link proxy type on P2 may be advertised in some manners, such as the IGP\BGP, etc. The advertisement message contains the function type of the SID, and may also contain the service function information corresponding to the SR proxy. In this embodiment, the service function is the FW. When P3 learns the SID information advertised by P2, P2 is the node to be protected, and the SID of the static proxy type is the type to be protected. If the advertisement message also carries that the service function information corresponding to the SR proxy is the FW, P3 may further match the service function information with the service function information of P3. If all the above information is matched, the corresponding remote END.AS SID entry is generated, and then the locator prefix corresponding to the P2 SID is flooded out with the low priority through the IGP, etc.

Embodiment 3

Figure 5:
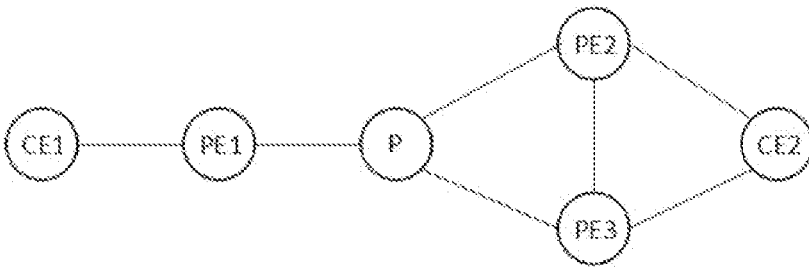
FIG. 5 is a schematic diagram of tail node/link failure protection networking of a failure protection method according to an optional embodiment of the disclosure.

FIG. 5 is a schematic diagram of tail node/link failure protection networking of a failure protection method according to an optional embodiment of the disclosure. As shown in FIG. 5, it is to be noted that the prefixes on PE1, PE2 and PE3 are LOC1, LOC2 and LOC3, respectively. VPN neighbors in the form of IPv6 are deployed between PE1-PE2, PE1-PE3 and PE2-PE3. A VPN instance VPN1 is configured on PE2 and PE3, remote (RT) parameters are carried in the VPN instance, at the same time, the SRv6 VPN SID is configured. The VPN SIDs on PE2 and PE3 are assigned as SID2 and SID3. After PE2 receives a private network route issued by CE2, the private network route is encapsulated into a VPN route and sent to PE3. The route carries the VPN SID, RT, RD and possible constraints.

In an SR-TE scenario, CE1 sends the traffic to CE2 through PE1, P, and PE2 successively along a designated SR-TE tunnel. PE1 may send the message in the form of: DA=SID-P, SRH<SID-PE1, SID-P, SID-PE2, SID2; SL=3>, where SID-PE1, SID-P, SID-PE2 correspond to the SIDs on PE1, P and PE2, respectively.

The protection relationship is configured on PE3. In the Embodiment 3, PE3 needs to protect the SID on PE2. The prefix to be protected is configured on PE3, and the prefix covers the SID to be protected, which may be one or more and is LOC2 in this embodiment. After the SID protection is configured on PE3, the LOC2 is flooded out with the low priority through the IGP, the anycast FRR is formed on P, the primary node is PE2 and the standby node is PE3. After receiving the VPN route from PE2, PE3 is crossed to VPN1 according to RT, PE3 uses the VPN SID information of the remote route and the prefix address in the SID protection configuration to perform the longest matching, if the matching is successful, the remote SRv6 VPN SID entry is generated, and the forwarding behavior is that the traffic is forwarded to CE2. The SID except the VPN SID on PE2 may be advertised through the IGP, and the advertisement message contains the corresponding locator prefix of the SID, the function type of the SID and other information. When the PE2 Locator prefix is found and learned on PE3 to be the same as or included in the locally configured SID protection prefix, a corresponding remote SID entry is generated according to the type of the PE2 SID. For example, if the SID of the type END exists on PE2, the END SID within the scope of the PE2 Locator locally generates the Remote SRv6 END SID entry, and the function is the type END.

After the protection relationship is configured on the standby node, under normal conditions, a traffic path is CE1-PE1-P-PE2-CE2, and the message sent by PE1 is DA=SID-P, SRH<SID-P, SID-PE2, SID2; SL=2>. When the PE2 node fails, the next hop of PE2 is sensed to be unreachable on P, an FRR path is switched, and the traffic is forwarded to PE3. At this time, the message sent by P is DA=SID-PE2, SRH<SID-PE1, SID-P, SID-PE2, SID2; SL=1>. PE3 reads the message, parses it to the Remote SRv6 END SID to be matched with SID-PE2, executes the END operation first, and the next SID to be processed is SID2, which is matched with the Remote SRv6 VPN SID, so as to forward the traffic to CE2.

Embodiment 4

In an SR-BE scenario, PE1 forwards the traffic sent to CE2 by CE1 according to an SR-BE tunnel. The traffic is forwarded according to the SR-BE tunnel, a destination address of the message sent by PE1 is the VPN SID (SID2) directly, and the nodes along the way perform forwarding according to an IPv6 forwarding table. After PE2 fails, the traffic is turned to a PE3 node, and SID2 directly hits the Remote SRv6 VPN SID for matching, so as to forward the traffic to CE2.

Embodiment 5

After receiving the private network route from PE2, PE3 is crossed to VPN1 according to RT to form a PE protected direct connection FRR entry, where the next primary hop is CE2, the next standby hop is PE2, and the PE2 VPN SID is carried. After receiving the private network route, PE2 is crossed to VPN1 according to RT to form a PE protected direct connection FRR entry, where the next primary hop is CE2, the next standby hop is PE3, and the PE3 VPN SID is carried. When the PE2-CE2 and PE3-CE2 links fail at the same time, the traffic forwarded from P is sent to PE2 first, PE2 senses that the links fail, triggers the PE to protect Customer Edge (CE) FRR switching, and forwards the traffic to PE3 by using the SID advertised by PE3. After receiving the traffic, PE3 also detects the local link fault and sends the message back to PE2, which causes the traffic to form a loop. Therefore, a solution of tail node link failure protection needs to consider to prevent the occurrence of the loop.

The embodiment mainly senses the link fault based on the primary node, and forwards the traffic to the standby node by using the SID of the primary node after triggering the primary node protected CE FRR switching. After receiving the SID, the standby node matches the Remote SID protection entry, continues to forward according to the entry in a case where the Remote SID entry is valid, and directly drops the message in a case where the Remote SID entry is invalid.

PE3 serves as the protection node of PE2, the protection relationship is configured on PE3, and the Remote VPN SID entry is generated. PE2 may receive the private network route from CE2, and after PE3 receives the private network route from CE2, the private network route is encapsulated into the VPN route and sent to PE2. After receiving the route from PE3, PE2 is crossed to VPN1 according to RT, thereby forming the PE protected direct connection FRR entry, where the next primary hop is CE2, the next standby hop is PE3, and the local VPN SID2 is carried.

In a case that the PE2-CE2 link fails, after the traffic is forwarded to PE2, it is founded that the main link of the FRR entry fails and the traffic is forwarded to PE3. During forwarding, the VPN SID uses the locally assigned VPN SID2 of PE2. When PE2 forwards the traffic to PE3, in order to ensure that the message may not be sent back to PE2 by the other nodes during the forwarding process of the traffic, the message sent by PE2 may not be directly forwarded by using the destination address of VPN SID2. The tunnel is matched through a tunnel strategy configured on PE2 or through a color in the BGP route. The VPN SID is encapsulated in the innermost layer of the tunnel for forwarding or forwarding by IP in IP. The destination IP on the head of the outer IP is filled with the PE3 BGP link establishment address, and the destination IP of the inner IP is filled with the local VPN SID, that is, the additional encapsulation and forwarding information is responsible for sending the message to PE3, and the inner VPN SID is responsible for loop prevention. After PE3 receives the message, VPN SID2 hits the local remote VPN SID entry, if the link between PE3 and CE2 is valid, the traffic is forwarded to CE2, and if the link between PE3 and CE2 also fails, the message is dropped.

Through the above embodiments, after a first node (standby node) receives the SID information advertised by a second node (primary node), if the SID information is matched with the protection information, a corresponding remote SID protection entry is generated. The remote SID protection entry provides the same function as the original SID, such as END, END.X, END.DT4, END.AS, etc. The first node needs to externally flood the prefix that covers the SID of the second node through a protocol such as the IGP, and the priority is lower than that of the second node during the flooding. Therefore, when the upstream protection node only has the basic IPv6 routing and forwarding function, it may be switched in a case of fault, and a backup path may provide the same function as a main path. Specially, when the method in the above optional embodiments is configured for failure protection of the tail node link in the SRv6 VPN scenario, the primary node receives the VPN route advertised by the CE and the standby node, and generates the FRR entry, where the next primary hop is the CE, and the next standby hop is the standby node, and the VPN SID of the primary node is carried. When the main link fails, the additional encapsulation and forwarding information of the primary node is responsible for sending the message to the standby node, and the VPN SID is carried for loop prevention. After the standby node receives the message, the VPN SID hits the remote SID entry. If a standby link also fails, the message is dropped, so as to achieve the purpose of preventing the loop.

Through the above description of implementations, those skilled in the art may clearly know that the method according to the above embodiments may be implemented by means of software plus a necessary common hardware platform, certainly by means of hardware; but in many cases, the former is the better implementation. Based on such understanding, the technical solution of the disclosure substantially or the part making a contribution to the conventional art can be embodied in the form of a software product. The computer software product is stored in a storage medium (such as a Read-Only Memory (ROM)/ Random Access Memory (RAM), a magnetic disk, and a compact disc), including a number of instructions for causing a terminal device (which may be a mobile phone, a computer, a server, or a network device, etc.) to perform the methods described in various embodiments of the disclosure.

The embodiments also provide a failure protection apparatus, which is configured to implement the above embodiments and preferred implementations. The embodiments and preferred implementations that have been elaborated will not be repeated here. The term "module" used below can realize a combination of software and/or hardware with an intended function. Although the device described in the following embodiment is preferably realized by software, but by hardware or a combination of software and hardware is also possible and conceived.

Figure 6:
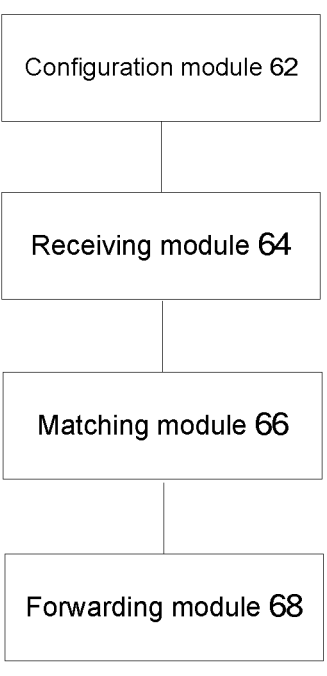
FIG. 6 is a structural block diagram of a failure protection apparatus according to an embodiment of the disclosure.

FIG. 6 is a structural block diagram of a failure protection apparatus according to an embodiment of the disclosure, as shown in FIG. 6, the apparatus includes a configuration module 62, a receiving module 64, a matching module 66, and a forwarding module 68.

The configuration module 62 is configured to configure a protection relationship on a standby node, the protection relationship being configured to indicate an object to be protected by the standby node.

The receiving module 64 is configured to receive SID information advertised by the primary node, the SID information at least including: an SID network programming function type and an SID value.

It is to be noted that, if an SID does not explicitly specify the network programming function type, there is a default network programming function type END, at this time, it is also considered that the SID information contains network programming function type information.

The matching module 66 is configured to match the SID network programming function type with an SID network programming function type of the standby node, match the SID value with the protection relationship, and generate a protection entry in a case where the SID network programming function type is successfully matched with an SID network programming function type of the standby node and the SID value is successfully matched with the protection relationship.

The forwarding module 68 is configured to forward, by the standby node, the received message according to the protection entry in a case where the primary node or a link connected to the primary node fails. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

Through the above technical solutions, the protection relationship is configured on the standby node, the protection relationship being configured to indicate the object to be protected by the standby node; the SID information advertised by the primary node is received, the SID information at least including: the SID network programming function type and the SID value; the SID network programming function type is matched with the SID network programming function type of the standby node, the SID value is matched with the protection relationship, and in a case where the SID network programming function type is successfully matched with an SID network programming function type of the standby node and the SID value is successfully matched with the protection relationship, the protection entry is generated; and in a case where the primary node or the link connected to the primary node fails, the standby node forwards the received message according to the protection entry. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node. That is, the protection relationship is configured on the standby node, in a case where the SID network programming function type is successfully matched with the SID network programming function type of the standby node and the SID value is successfully matched with the protection relationship, the protection entry is generated, and then in a case where the primary node or the link connected to the primary node fails, the standby node forwards the received message according to the protection entry. Through the adoption of the above technical solution, the problems that in the related failure protection technologies, during failure protection, the intermediate node protection and the tail node protection generally adopt different technologies, which leads to the difficulty in device deployment, etc. are solved. The technical solutions of the disclosure are applicable to the failure protection of an intermediate node and an egress node, and a path switched after the fault may provide the same function as the original path.

It is to be noted that the solutions of the disclosure are only applicable to a situation in which both primary and standby nodes support SRv6 networking, excluding SR-MPLS. In addition, the other nodes in the network do not have to support the SRv6. Furthermore, after the protection relationship is configured on the standby node, if the SID information advertised by the primary node received by the standby node is within the scope of protection, but the standby node does not have the protective capability, the behaviors such as dropping the message and generating an alarm may be performed. The behaviors may be default or configured according to the requirements.

In an embodiment, the configuration module is further configured to configure the protection relationship on the standby node by configuring the prefix of the primary node to be protected on the standby node, configuring the primary node to be protected on the standby node, configuring the SID value of the primary node to be protected on the standby node, configuring the SID network programming function type of the primary node to be protected on the standby node, etc.

That is, when the protection relationship is configured on the standby node, the prefix of the primary node to be protected may be configured on the standby node, which may overwrite the required SID of the primary node. One or more prefixes of the primary node to be protected are configured on the standby node, for example, the prefix of the primary node is LOC2, and the prefix LOC2 to be protected may be configured on the standby node. The primary node to be protected may also be configured on the standby node. The SID value of the primary node to be protected may also be configured on the standby node, and the SID network programming function type of the primary node to be protected may also be configured on the standby node, for example, the SID type of the primary node is END, so that the SID of the END type to be protected may be configured on the standby node. No limits are made to the SID information, the prefix of the primary node, etc. in the embodiments of the disclosure.

In an exemplary embodiment, the apparatus further includes a flooding module, configured to instruct the standby node to externally flood the prefix of the primary node with a low priority, the low priority being lower than the priority of the primary node during flooding.

That is, the primary node advertises the SID information of the primary node. The advertisement manner may be an IGP, a BGP, etc. No limits are made thereto in the embodiments of the disclosure. An advertisement message includes: the SID value and the type of the SID information. After the SID information advertised by the primary node is matched with the protection relationship saved by the standby node, the standby node floods out the prefix of the primary node with a priority lower than that of the primary node. The flooding manner be the IGP. No limits are made thereto in the embodiments of the disclosure, so that the traffic is sent to the primary node, and in a case where the primary node fails, the traffic is forwarded to the standby node again.

Further, the apparatus further includes a revocation module, configured to revoke, by the standby node, the externally flooded prefix of the primary node after instructing the standby node to externally flood the prefix of the primary node with the low priority in a case where the standby node no longer has the ability to protect the prefix of the primary node, the primary node, the SID value of the primary node, or the SID network programming function type of the primary node, and then the standby node no longer has the protection relationship.

In an embodiment, the matching module is further configured to match, in a case where service function information is also carried in the SID information advertised by the primary node, and the SID network programming function type is an SR proxy function, the SID network programming function type of the standby node with the SR proxy function; match, in a case where the SID network programming function type of the standby node is matched with the SR proxy function, service function information of an SR proxy of the standby node with the service function information corresponding to the SR proxy function of the primary node; and generate the protection entry in a case where the service function information of the SR proxy of the standby node is successfully matched with the service function information corresponding to the SR proxy function of the primary node.

In an embodiment, if the advertisement message also carries that the SID network programming function type is the SR proxy function, the SR proxy function is matched first. In a case where the standby node also has the SR proxy function, the matching is successful, and then the service function information corresponding to the SR proxy function also needs to be matched. In a case where the standby node also has the service function information corresponding to the SR proxy function, the matching is successful, and then the protection entry may be generated. It is to be noted that, if the SR proxy function of the primary node is mismatched with one of the service function information corresponding to the SR proxy function, the protection entry is not generated. After the corresponding protection entry is generated, the prefix corresponding to the primary node is flooded out with the low priority through the IGP, etc. For example, if the service function information corresponding to the SR proxy is a FW, the standby node may further match a FW type with the service function information of the standby node, and generate the corresponding protection entry if all are matched.

Further, if a FW node represents a device that does not support SRv6, the primary node and the standby node have the proxy function, that is, they may replace the FW to process the message. Before the message is sent to the FW node, a header is stripped, and after the FW has processed the message and sent it back to the proxy, the proxy encapsulates and continues to forward the header.

In an exemplary embodiment, the matching module is further configured to, in a case where service function information is also carried in the SID information advertised by the primary node, after the standby node receives a VPN route encapsulated by the primary node, match the network programming function type in the VPN route with the SID network programming function type of the standby node; in a case where the network programming function type in the VPN route is matched with the SID network programming function type of the standby node, match VPN service information of the SID network programming function type of the standby node with the VPN service information corresponding to the SID network programming function type in the VPN route of the primary node; and in a case where the VPN service information with the SID network programming function of the standby node is matched with the VPN service information corresponding to the SID network programming function type in the VPN route of the primary node, generate the protection entry.

In an embodiment, after the standby node receives the VPN route sent by the primary node, the standby node performs the longest matching on the VPN SID information in the VPN route and a prefix address in the protection relationship, and in a case where the VPN service information of the standby node is matched with the VPN service information in the VPN route, the protection entry is generated. The forwarding behavior is that the traffic is forwarded to a target object.

In an embodiment, the matching module is further configured to match, by the standby node in a case where link information is also carried in the SID information advertised by the primary node, the SID network programming function type with the SID network programming function type of the standby node; match, by the standby node in a case where the SID network programming function type is successfully matched with the SID network programming function type of the standby node, the link information with link information of the standby node; and generate the protection entry in a case where the link information is successfully matched with the link information of the standby node.

In an embodiment, after the standby node receives the link information carried in the SID information sent by the primary node, the standby node matches the SID network programming function type with the SID network programming function type of the standby node, and matches the link information with the link information of the standby node, and in a case where they are successfully matched, the protection entry is generated, and the message is instructed to be sent to the target object along the link.

In an exemplary embodiment, the forwarding module is further configured to receive, by the standby node in a case where the primary node does not fail, but the link of a VPN network connected to the primary node fails, a target message sent by the primary node and encapsulated in a preset manner, the target message including a VPN SID assigned to the VPN network by the primary node; and forward, by the standby node in a case where the VPN SID is matched with the protection entry, the received message according to the protection entry. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

It may be understood that in order to prevent the occurrence of a loop, in a case where the link of the primary node fails, after the traffic is forwarded to the primary node, it is found that the link of the primary mode fails, the primary node carries the VPN SID assigned for forwarding the message and forwards the message to the standby node. When the primary node forwards the message to the standby node, in order to ensure that the message is not sent back to the primary node by the other nodes during forwarding, the message sent by the primary node is not directly forwarded by using the VPN SID, and the message carrying the VPN SID is sent to the standby node through an additional encapsulation path or tunnel. After receiving the traffic, the standby node hits the protection entry of the VPN SID of the primary node, and the actions of the protection table entry are that: if the link of the standby node is valid, the traffic is forwarded to the target object, and if the link of the standby node also fails, the message is dropped.

In an embodiment, the above encapsulation manner may be as follows: the tunnel is matched through a tunnel strategy configured on the primary node or through preset conditions in a BGP route, and the VPN SID is encapsulated in the innermost layer of the tunnel for forwarding, or forwarded by IP in IP, a destination IP on the head of an outer IP is filled with a PE3 BGP link establishment address, and a destination IP of an inner IP is filled with a local VPN SID. No limits are made to the encapsulation manner of the VPN SID in the embodiments of the disclosure.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

The embodiments of the disclosure also provide a storage medium, in which a computer program is stored. The computer program is configured to perform, when running, the steps in any of the above method embodiments.

In an embodiment, the storage medium may be configured to store the computer program for performing the following steps.

At S1, a protection relationship is configured on a standby node, the protection relationship being configured to indicate an object to be protected by the standby node.

At S2, SID information advertised by a primary node is received, the SID information at least including: an SID network programming function type and an SID value.

At S3, the SID network programming function type is matched with an SID network programming function type of the standby node, the SID value is matched with the protection relationship, and in a case where the SID network programming function type is successfully matched with an SID network programming function type of the standby node and the SID value is successfully matched with the protection relationship, a protection entry is generated.

At S4, in a case where the primary node or a link connected to the primary node fails, the standby node forwards a received message according to the protection entry. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

In an embodiment, the storage medium may include, but are not limited to, a USB flash disk, an Read-Only Memory (ROM), an Random Access Memory (RAM), a mobile hard disk, a magnetic disk, a compact disc, and other media capable of storing the computer program.

The embodiments of the disclosure also provide an electronic device, which includes a memory and a processor. The memory stores a computer program. The processor is configured to run the computer program, so as to execute the steps in any of the above method embodiments.

In an embodiment, the electronic device may further include a transmission device and an input and output device. The transmission device is connected with the processor, and the input and output device is connected with the processor.

In an embodiment, the process may be configured to perform the following steps through the computer program.

At S1, a protection relationship is configured on a standby node, the protection relationship being configured to indicate an object to be protected by the standby node.

At S2, SID information advertised by a primary node is received, the SID information at least including: an SID network programming function type and an SID value.

At S3, the SID network programming function type is matched with an SID network programming function type of the standby node, the SID value is matched with the protection relationship, and in a case where the SID network programming function type is successfully matched with an SID network programming function type of the standby node and the SID value is successfully matched with the protection relationship, a protection entry is generated.

At S4, in a case where the primary node or a link connected to the primary node fails, the standby node forwards a received message according to the protection entry. In a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

In an embodiment, the storage medium may include, but are not limited to, a USB flash disk, an ROM, an RAM, a mobile hard disk, a magnetic disk, a compact disc, and other media capable of storing program codes.

Optionally, the specific examples in this embodiment may refer to the above embodiments and the examples described in the optional implementations, which will not be elaborated herein.

It is apparent that those skilled in the art should appreciate that the above modules and steps of the disclosure may be implemented by a general-purpose computing device, and they may be centralized in a single computing device or distributed on a network composed of multiple computing devices; they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore, the disclosure is not limited to any particular combination of hardware and software.

The above are only the preferred embodiments of the disclosure, and is not intended to limit the disclosure, and for those of ordinary skill in the art, various modifications and changes can be made to the disclosure. Any modifications, equivalent replacements, improvements and the like within the principle of the disclosure shall be included in the scope of protection of the disclosure.

What is claimed is:

1. A failure protection method, comprising:

configuring a protection relationship on a standby node, wherein the protection relationship is configured to indicate an object to be protected by the standby node;

receiving, by the standby node, Segment Identifier (SID) information advertised by a primary node, wherein the SID information at least comprises: an SID network programming function type and an SID value;

matching, by the standby node, the SID network programming function type with an SID network programming function type of the standby node, matching the SID value with the protection relationship, and in a case where the SID network programming function type is successfully matched with an SID network programming function type of the standby node and the SID value is successfully matched with the protection relationship, generating a protection entry; and in a case where the primary node or a link connected to the primary node fails, forwarding, by the standby node, a received message according to the protection entry, wherein in a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

2. The method according to claim 1, wherein the configuring a protection relationship on a standby node comprises at least one of the following:

configuring a prefix of the primary node to be protected on the standby node;

configuring the primary node to be protected on the standby node;

configuring the SID value of the primary node to be protected on the standby node; and configuring the SID network programming function type of the primary node to be protected on the standby node.

3. An electronic device, comprising a memory and a processor, wherein the memory stores a computer program, and the processor is configured to run the computer program, so as to perform the method according to claim 2.

4. A non-transitory computer readable storage medium, in which a computer program is stored, wherein when running, the computer program is configured to perform the method according to claim 2.

5. The method according to claim 1, wherein after the SID network programming function type is successfully matched with the SID network programming function type of the standby node and the SID value is successfully matched with the protection relationship, the method further comprises:

instructing the standby node to externally flood the prefix of the primary node with a low priority, wherein the low priority is lower than the priority of the primary node during flooding.

6. The method according to claim 5, wherein after instructing the standby node to externally flood the prefix of the primary node with the low priority, the method further comprises:

in a case where the standby node no longer has ability to protect the prefix of the primary node, the primary node, the SID value of the primary node, or the SID network programming function type of the primary node, revoking, by the standby node, the externally flooded prefix of the primary node.

7. An electronic device, comprising a memory and a processor, wherein the memory stores a computer program, and the processor is configured to run the computer program, so as to perform the method according to claim 6.

8. An electronic device, comprising a memory and a processor, wherein the memory stores a computer program, and the processor is configured to run the computer program, so as to perform the method according to claim 5.

9. A non-transitory computer readable storage medium, in which a computer program is stored, wherein when running, the computer program is configured to perform the method according to claim 5.

10. The method according to claim 1, wherein in a case where service function information is also carried in the SID information advertised by the primary node, the method further comprises:

in a case where the SID network programming function type is a Segment Routing (SR) proxy function, matching the SID network programming function type of the standby node with the SR proxy function;

in a case where the SID network programming function type of the standby node is matched with the SR proxy function, matching service function information of an SR proxy of the standby node with the service function information corresponding to the SR proxy function of the primary node; and in a case where the service function information of the SR proxy of the standby node is successfully matched with the service function information corresponding to the SR proxy function of the primary node, generating the protection entry.

11. An electronic device, comprising a memory and a processor, wherein the memory stores a computer program, and the processor is configured to run the computer program, so as to perform the method according to claim 10.

12. The method according to claim 1, wherein in a case where Virtual Private Network (VPN) service information is also carried in the SID information advertised by the primary node, the method further comprises:

after the standby node receives a VPN route encapsulated by the primary node, matching the SID network programming function type in the VPN route with the SID network programming function type of the standby node;

in a case where the SID network programming function type in the VPN route is matched with the SID network programming function type of the standby node, matching VPN service information of the SID network programming function type of the standby node with the VPN service information corresponding to the SID network programming function type in the VPN route of the primary node; and in a case where the VPN service information with the SID network programming function of the standby node is matched with the VPN service information corresponding to the SID network programming function type in the VPN route of the primary node, generating the protection entry.

13. The method according to claim 12, wherein in a case where the primary node does not fail, but the link of a VPN network connected to the primary node fails, the method further comprises:

receiving, by the standby node, a target message sent by the primary node and encapsulated in a preset manner, wherein the target message comprises a VPN SID assigned to the VPN network by the primary node; and in a case where the VPN SID is matched with the protection entry, forwarding, by the standby node, the received message according to the protection entry, wherein in a case where the primary node and the link connected to the primary node do not fail, other nodes send the message to the primary node, and in a case where the primary node or the link connected to the primary node fail, the other nodes directly send the message to the standby node, the other nodes being other nodes except the primary node and the standby node.

14. An electronic device, comprising a memory and a processor, wherein the memory stores a computer program, and the processor is configured to run the computer program, so as to perform the method according to claim 13.

15. An electronic device, comprising a memory and a processor, wherein the memory stores a computer program, and the processor is configured to run the computer program, so as to perform the method according to claim 12.

16. The method according to claim 1, wherein in a case where link information is also carried in the SID information advertised by the primary node, the method further comprises:

matching, by the standby node, the SID network programming function type with the SID network programming function type of the standby node;

in a case where the SID network programming function type is successfully matched with the SID network programming function type of the standby node, matching, by the standby node, the link information with link information of the standby node; and in a case where the link information is successfully matched with the link information of the standby node, generating the protection entry.

17. An electronic device, comprising a memory and a processor, wherein the memory stores a computer program, and the processor is configured to run the computer program, so as to perform the method according to claim 16.

18. A non-transitory computer readable storage medium, in which a computer program is stored, wherein when running, the computer program is configured to perform the method according to claim 1.

19. An electronic device, comprising a memory and a processor, wherein the memory stores a computer program, and the processor is configured to run the computer program, so as to perform the method according to claim 1.

* * * * *